United States Patent [19]
Shinskey

[11] 3,794,817
[45] Feb. 26, 1974

[54] ADAPTIVE NON-LINEAR CONTROL SYSTEM

[75] Inventor: Francis G. Shinskey, Foxboro, Mass.

[73] Assignee: The Foxboro Company, Foxboro, Mass.

[22] Filed: Oct. 31, 1972

[21] Appl. No.: 302,632

[52] U.S. Cl. .......................... 235/150.1, 235/151.12
[51] Int. Cl. .......................................... G05b 11/01
[58] Field of Search .................................. 235/150.1

[56] References Cited
UNITED STATES PATENTS
3,216,676  11/1965  Brown et al. .......................... 244/77
3,691,354  9/1972  Green et al. ...................... 235/150.1

Primary Examiner—Eugene G. Botz
Attorney, Agent, or Firm—Norman E. Brunell

[57] ABSTRACT

An adaptive control system for use with non-linear processes, utilizing a non-linear controller with remotely adjustable deadband width, and an adaptive controller to perform said adjustment. The adaptive controller operates on the same deviation signal as the non-linear controller, but has a discriminator circuit in its input that reacts in opposite directions to high and low-frequency components in the deviation signal. Oscillations of the process at the natural period of the control loop are made to cause the non-linear deadband width to expand, while drift or offset causes it to contract. A 50 to 1 change in process gain can be accommodated with this system. The system is especially successful on non-linear processes such as the pH control of a chemical waste of randomly variable composition. By avoiding continuous cycling, the system can result in reduction in reagent usage of 50 percent, while still meeting effluent specifications.

15 Claims, 7 Drawing Figures

3,794,817

ADAPTIVE NON-LINEAR CONTROL SYSTEM

BACKGROUND OF THE INVENTION

1. Field of the Invention

This invention relates to set point process control systems of the so-called "non-linear" or "deadband control" type. In this type of system the gain or proportional band of the controller is a function of the magnitude of the deviation between the measured variable and the set point.

A non-linear controller of the type described above finds its greatest application in control systems for non-linear processes where the process gain varies with the magnitude of the deviation. One example of a system exhibiting this characteristic is a pH controlled process. In controlling the pH of the effluent from a chemical plant to comply with the requirements of the environmental protection laws, the non-linearity of the relationship between the deviation and process gain makes the use of conventional linear forms of control undesirable.

Waste streams from chemical, petroleum, metal, and food-processing plants typically contain mixtures of weak and strong acids, bases, and salts, such that the relationship between the flow of neutralizing reagent and pH is quite variable. This relationship is normally presented in a graphical form called a titration curve.

The steady-state process gain is the slope of the titration curve at the set point. Increasing deviation of pH from the set point in either direction generally results in lower gain due to the "S" shape of the curve. Thus if the gain of a linear pH control loop exceeds unity at the set point, oscillation will expand to the point where the falling process gain reduces the loop gain to unity. Typically, then, pH control loops tend to limit cycle with an amplitude proportional to the slope of the titration curve. Cycling, even within the limits required in a particular situation, is to be avoided because it wastes expensive reagents.

Because of the non-linear nature of the titration curve, a non-linear controller has been devised to provide a more suitable match. In addition to the normal three control modes, an additional circuit develops a non-linear relationship between the deviation signal, developed by subtracting the measurement value from the set point value, and the error signal acted on by the control modes. This non-linear function provides a relatively low gain for values of deviation within a particular range surrounding the set point. This low gain range is called the "deadband." Outside of the deadband, a higher gain is available. The low gain within the deadband is intended to minimize the tendency to cycle, while the higher gain regions provide recovery from upsets to the process. The deadband width is therefore adjusted by the operator to prevent or reduce limit cycling while minimizing process drift.

Although great improvements in the control of non-linear processes were made by the recent introduction of non-linear controllers, many problems still remain. Even with a non-linear controller, under certain variations of the process titration curve, a limit cycle can develop which exceeds the deadband. If the deadband is set too wide, the pH tends to linger beyond the allowable range for too long a time, particularly when process gain is low.

Although it is possible to perform similar operations utilizing large digital computer systems, the typical industrial situation is often a small, remotely located operation, such as a remote waste treatment facility. Such facilities do not justify the large expenditures involved in setting up a digital control system. This invention therefore relates primarily, but not exclusively, to analog control systems as will be described herein.

2. Description of the Prior Art

The art of adaptive control has been developed to correct conceptually related problems in linear control systems. The adaptive control systems shown in the prior art generally fall into five categories as follows: the model type, the perturbation type, the limits cycle type, the frequency servo type and the frequency comparison type. The model type of system uses a simulated model of the process to develop a signal indicative of the required gain of the controller under similar conditions. When the signal from the model differs from the value of the controller gain an appropriate adjustment is made.

The perturbation type of system introduces a disturbance and observes the response of the system due to this perturbation. The system gain is then adjusted to obtain the desired response characteristics. The limit cycle type of system develops high frequency oscillations (a limit cycle) in the closed loop system. The gain is then adjusted to obtain the correct limit cycle response. The frequency servo type of system detects the low frequency oscillations of the system output around the set point value. The gain of the system is then adjusted to obtain the desired frequency of oscillation.

The frequency comparison type of system compares the response of the system within certain frequency ranges and changes the gain of the system to get the desired system response.

A good example of an adaptive controller of this latter type is found in U.S. Pat. No. 2,517,081, issued on Aug. 1, 1950 to W. I. Caldwell, entitled "Control System with Automatic Response Adjustment." The device described in that patent is an adaptive pneumatic three-mode controller whose linear proportional gain is linearly increased if the process begins to drift and decreased if the process begins to oscillate. In addition, the controller automatically adapts or adjusts the other two modes. The rate time and reset time are automatically adjusted proportional to the period of oscillation of the output. These modes are readjusted only when and if oscillation recurs. This linear controller would not be usable with a non-linear process because the non-linearity of the process gain would cause the controller to continuously adapt from high to low proportional band gain as the process alternated between continuous oscillation and drift.

Adaptive electronic controllers are also known in the art. One example is U.S. Pat. No. 3,535,496, issued on Oct. 20, 1970, to R. M. Bakke which shows a linear controller whose gain is adapted according to a frequency analysis of the loop's response to control action. However, this controller would not work effectively with a non-linear process because the gain would be continuously adapted as the process gain changed, resulting in limit cycling.

These prior art control systems are not concerned with non-linear controllers. In particular, these prior art control systems do not adapt the deadband of a non-linear controller in response to changes in process parameters.

SUMMARY OF THE INVENTION

It is a significant contribution to the field of non-linear process control to recognize that the above-described difficulties resulting from the application of a non-linear controller to a non-linear process are dependent upon the variable relationship between the non-linearity of the process and the non-linearity of the controller. In the ideal situation, this relationship would be constant and the resultant loop gain would be independent of deviation.

However, it has been determined that the gains of certain non-linear processes, such as a pH controlled effluent, vary not only as a function of deviation but also as a function of other process variables, in particular, the composition of the effluent. The high gain band of the process therefore effectively varies in width as a function of unpredictable variables. The deadband of a conventional non-linear controller, however, is fixed and cannot continue to cancel the changed non-linearity of the process.

A control system for time varying non-linear processes is therefore provided which utilizes a non-linear or deadband electronic controller to produce a control signal in response to measurement and set point inputs. In addition, an adaptive controller is utilized to provide a width adjustment to the non-linear controller to compensate for variations in the process gain function. The width adjustment is based on a frequency analysis of the same set point and measurement inputs acted on by the non-linear controller.

The adaptive controller has been designed to adjust the deadband width so that the resultant loop gain is substantially independent of deviation thereby minimizing the tendency to limit cycle.

The heart of the adaptive controller is a discriminator circuit. This circuit separates the deviation into high and low frequency components as determined by a crossover-frequency adjustment. The cross-over frequency is chosen so that the high frequency band includes the natural period of oscillation of the control loop. The two components are then oppositely polarized and recombined before being sent to the proportional and reset modes of the adaptive controller.

If oscillation in the high-frequency band is present, the discriminator will develop a positive signal which will widen the deadband of the non-linear controller to extinguish the oscillations. If drift or offset (low-frequency) components exist, the discriminator output will be negative causing the deadband of the non-linear controller to shrink. The adaptive controller is only satisfied with either zero deviation, or oscillation precisely at the cross-over frequency and equally distributed on both sides of the set point.

DETAILED DESCRIPTION OF THE PREFERRED EMBODIMENT

Figure 1:
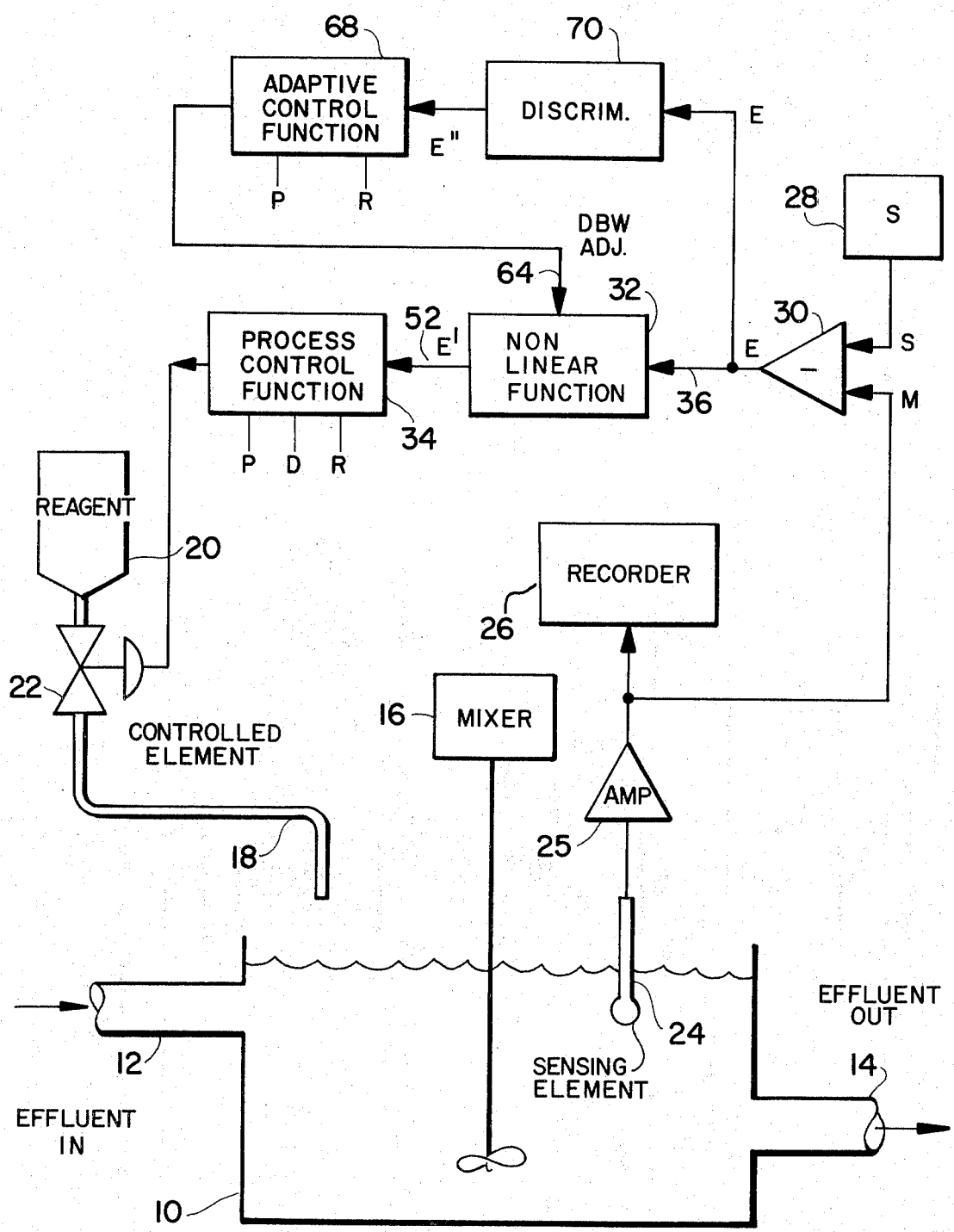
FIG. 1 is a block diagram representation of an adaptive non-linear control system for controlling the pH of an effluent showing a preferred embodiment of the instant invention.

FIG. 1 shows a complete adaptive non-linear control system for the control of the pH of an effluent as one preferred embodiment of the invention. The effluent to be measured and controlled enters tank 10 through inlet 12 and is exhausted, either continuously or in batches, through outlet 14. Mixer 16 is included with tank 10 to aid in the effluent reagent reaction. Reagent is added to tank 10 through reagent inlet 18 from reagent source 20. Reagent flow is controlled by valve 22 which is the controlled element of the control system to be described below.

Near the outlet side of tank 10 is sensing element 24 which, in the case of a pH control system, would be a pH sensitive electrode. The signal generated by sensing element 24 is amplified by amplifier 25 and may be displayed and recorded by recorder 26. This signal serves as the measured variable input signal M of the control system. Generator 28 supplies the set point signal S to the control system.

Subtractor 30 determines the deviation signal E which is the difference between measurement and set. This deviation signal is applied to both the primary control loop (the non-linear controller to be described below) and the adaptive loop. The primary control loop will be described first and then the adaptive loop.

For the purposes of this discussion, an arbitrary distinction will be drawn between the terms "deviation signal E," defined above as the difference between measurement and set, and "error signal E'," which is the deviation signal modified by the non-linear function.

In the primary loop, the deviation signal E is processed by non-linear function generator 32 to compensate for the short-term non-linearity of the process. The operation of this device and the need for its existence may be best described with reference to the graphs of FIG. 2.

Figure 2A:
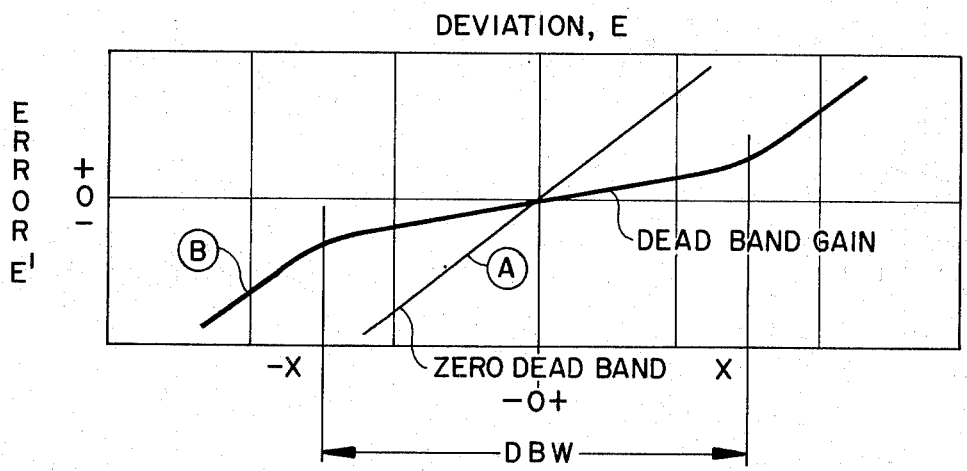
FIGS. 2a and 2b are graphical presentations of a non-linear controller deadband and a non-linear process titration curve.

FIG. 2A is a graph of the error signal E generated by non-linear function generator 32 in response to deviation E for two values of deadband width. Line A represents E' for a deadband width equal to zero. This condition is equivalent to linear control. Line B represents the error signal E' for a positive value of deadband width DBW. As can be seen from the graph, the deadband occurs for values of deviation between +X and −X. Between those values, the non-linear function generator has a much lower gain (the deadband gain) than for values of deviation outside of that range.

Figure 2B:
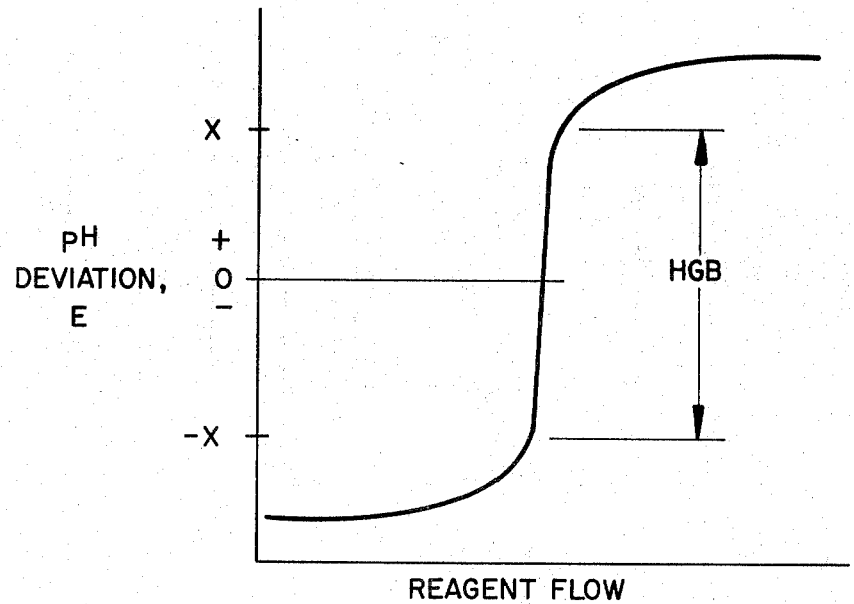

The usefulness of this non-linear function becomes apparent with reference to FIG. 2B. This graph is a titration curve of a pH process showing pH deviation as a function of reagent flow. The process gain for any point is the derivative of this curve.

As can be seen from the graph, the process has a band of high gain, HGB, for values of deviation between −X and X. The process gain outside of this band is lower. It can be seen by comparison of FIG. 2A and FIG. 2B that if the deadband width DBW of the controller is approximately equal to the high gain band HGB of the process, the resultant loop gain would be nearly constant. This condition results in vastly improved control as long as the process gain function, i.e., the high gain band width, remains constant.

Figure 3:
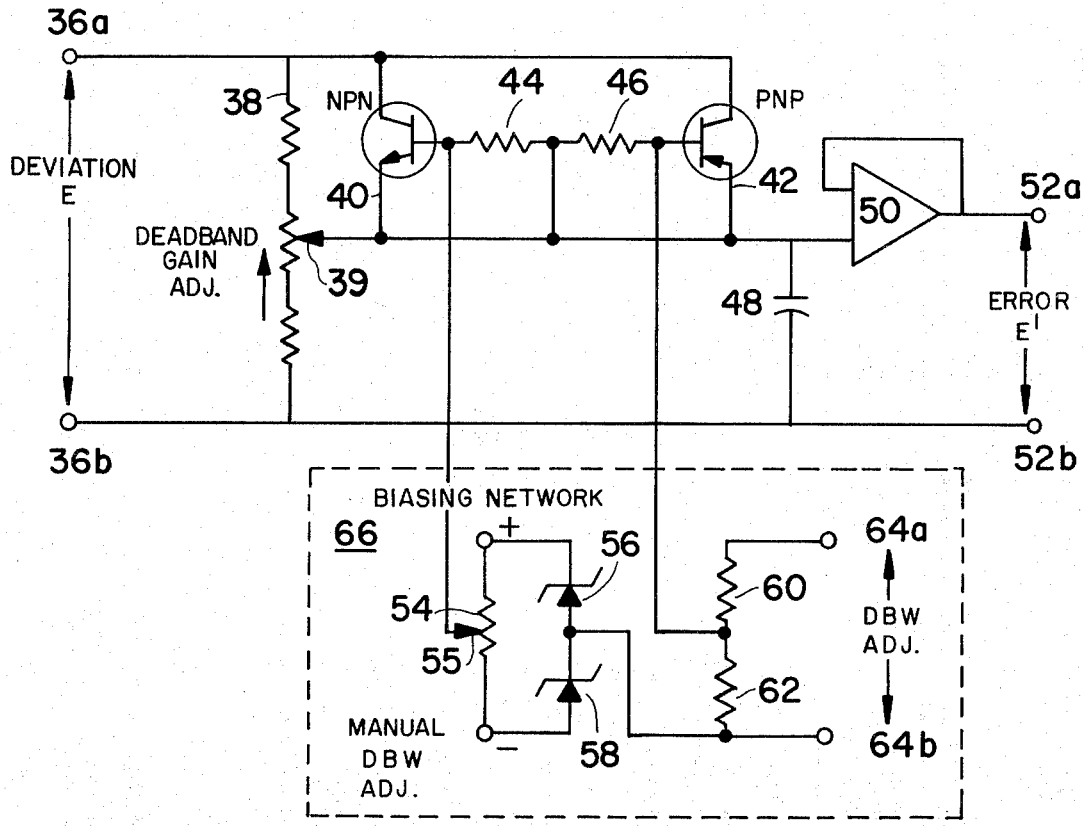
FIG. 3 is a schematic representation of a preferred embodiment of the non-linear function generator shown in FIG. 1.

An electronic circuit capable of generating such a non-linear function is shown in detail in FIG. 3.

In the operation of this non-linear function generator, the deviation signal is applied to adjustable voltage divider 38 between input terminals 36a and 36b. Wiper 39 of this divider is filtered by capacitor 48 and serves as the input to 1:1 output amplifier 50. Divider 38 is partially bypassed by complementary transistors 40 and 42. The bases of these transistors are connected to wiper 39 through resistors 44 and 46 and also to biasing network 66. If the base voltage of these transistors equals the emitter voltage, the transistors act like diodes in the circuit offering high resistance to input signals of less than approximately 0.6 of a volt. This creates a ± 0.6 volt deadband.

If, however, the base of NPN transistor 40 is biased .6 volt above its emitter, and the base of PNP transistor 42 is biased .6 volt below its emitter, the transistors will conduct signals of all voltages and thereby eliminate the deadband. If the transistors are biased in the opposite direction, the DBW increases.

The bias voltages are supplied by biasing network 66 which provides both manual and remote DBW adjustment. The manual adjustment is provided by potentiometer 54 which is connected across a power supply not shown. Wiper 55 of potentiometer 54 is connected to the base of transistor 40.

A pair of zener diodes 56 and 58 are connected across the power supply in series. The common point between them is tied to DBW ADJ. input 64 across which are connected resistors 60 and 62. The common point between these resistors serves as the bias for transistor 42. Adjustment of the values of these resistors provides a span adjustment.

It should be noted that the manual DBW ADJ. should be set to zero, except as noted below with regard to burst cycling, when an adaptive loop is present to provide a remote DBW ADJ. signal. The remote DBW ADJ. signal is always positive so that the manual and remote signals are additive. Therefore, any DBW ADJ. signal due to potentiometer 54 becomes a minimum DBW when the adaptive loop is present.

Returning now to complete the discussion of the primary loop depicted in FIG. 1, the error signal E', generated by non-linear function generator 32, is supplied to control function generator 34 of conventional design. In FIG. 1, the non-linear controller shown consists of set point generator 28, subtractor 30, non-linear function generator 32 and control function generator 34. Except for the non-linear function generator, these components are found in a conventional linear controller. The non-linear controller may therefore be conveniently formed from a three-mode linear controller in which a non-linear function generator has been inserted. It is well within the ordinary skill in the controller art to determine the proper point in a linear controller in which to insert the non-linear function generator, and to perform such insertion. It is therefore unnecessary to describe control function generator 34 in any greater detail.

To complete the loop, the control signal output is supplied to valve 22 to vary reagent flow from reservoir 20. The system may utilize a single reagent and a single valve or two reagents and two valves controlled by the same signal.

The primary control loop described above is of conventional non-linear design except for generator 32 which is shown, as required by this invention, to have a remotely adjustable DBW. In a conventional system, the DBW would be manually adjusted to a suitable value and allowed to remain at that value.

The instant invention is characterized by the addition, to a non-linear control loop as described above, of the feedback or adaptive loop shown in FIG. 1 which comprises adaptive control function generator 68 and input discriminator 70. Control function generator 68 is of conventional design and may well be identical to control function generator 34 in a particular system. In the adaptive loop, however, only a two-mode controller having proportion and reset modes is required.

In fact, for convenience, discriminator 70, to be described below, may be fashioned from the unused rate or derivative mode components of the conventional controller whose control function generator was used as adaptive control function generator 68.

Figure 4:
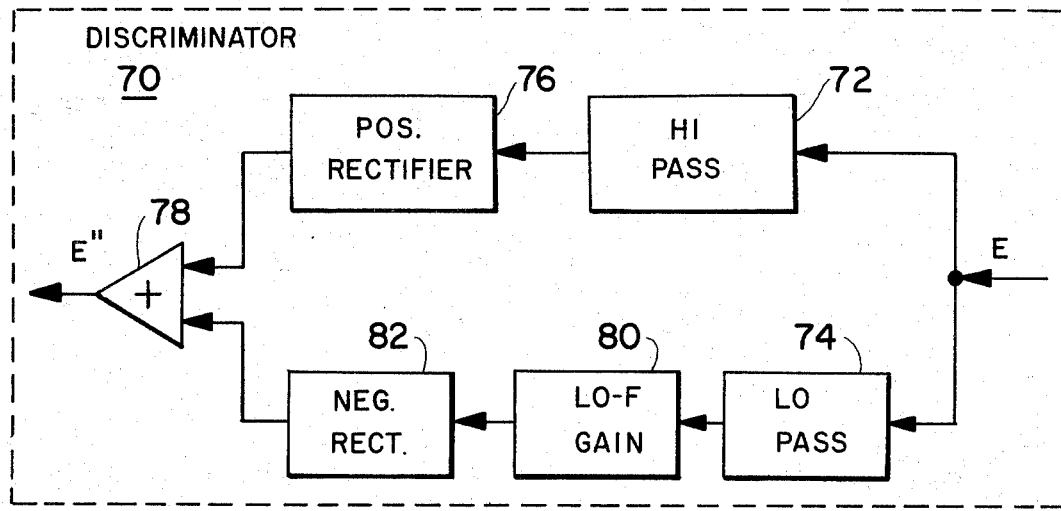
FIG. 4 is a block diagram representation of a preferred embodiment of the discriminator circuit shown in FIG. 1.

A typical discriminator is shown, in block diagram form, in FIG. 4. The purpose of this device is to separate and weight the frequency bands present in the measurement signal representing oscillation and drift. To accomplish this purpose, deviation signal E is processed by high pass filter 72 and low pass filter 74, both of conventional design. The cutoff or cross-over frequency is chosen so that the high pass filter will pass a signal oscillating at the natural response frequency of the process. This signal is rectified to a positive value by rectifier 76. Any signal that is passed by filter 74, after a gain adjustment is affected by gain stage 80, is rectified to a negative value by rectifier 82. These signals are then combined by summer 78, the output of which is the adaptive error signal E''.

As shown in FIG. 1, adaptive error signal E'' serves as the input to adaptive function generator 68. The control signal output of this unit is supplied to the DBW ADJ. input 64 of non-linear function generator 32 to complete the adaptive loop.

In FIG. 1 the adaptive controller shown consists of set point generator 28, subtractor 30 (both of which are shared with the non-linear controller), discriminator 70 and function generator 68. In an alternate embodiment the adaptive controller may be constructed from a linear controller by the addition of a discriminator in the same way that the non-linear controller may be formed from a linear controller by the addition of a non-linear function generator. Then, instead of supplying deviation signal E directly to the discriminator, it will be necessary to supply the measurement signal M to the subtractor of the adaptive controller and adjust the set point generator to the same value as set point generator 28. However, for ease of description, the two controllers are shown in FIG. 1 as sharing one subtractor and set point generator.

In operation of this system, the process control function parameters, of the non-linear controller, P, D, and R are adjusted in the conventional manner. The adaptive control function parameters, P and R, are adjusted so that the integral or reset mode predominates. The last remaining adjustment is the low-frequency gain of the discriminator which is used to prevent burst cycling. Burst cycling is the repeated "bursts" of process oscillation that may result from the periodic over-narrowing of the deadband in an adaptive system of this type.

In a pH process of the type described it is unlikely that the measurement would exactly equal the set point for any substantial length of time because of the high process gain in the vicinity of the set point. In the usual situation the process measurement will drift slightly from the set point even after all major disturbances have died out. The non-linear controller will attempt to eliminate this drift or offset utilizing the low gain of the deadband. While this is occuring, however, the adaptive loop will cause the deadband to narrow. Without the low-frequency gain unit the deadband will be narrowed too much before the non-linear controller is able to correct the drift. Even a small disturbance will then be able to drive the measurement outside of the deadband. Limit cycling will occur until the adaptive loop causes the deadband to widen enough to quench the oscillation. When the oscillation dies out the adaptive loop will narrow the deadband and the limit cycling will recur. Burst cycling of this type is to be avoided because it wastes expensive reagents and interferes with control. To prevent burst cycling it is only necessary to keep the deadband from becoming over-narrow. This may be accomplished by either providing a minimum DBW or by decreasing the rate at which the deadband is narrowed by the adaptive loop.

A minimum DBW may be provided by adjusting potentiometer 54. The remote DBW ADJ. signal supplied by the adaptive loop will then be added to the minimum DBW determined by this setting. The disadvantage in using this procedure to reduce burst cycling is that the minimum DBW reduces the range of the control system and therefore the range of process gain variation that may be effectively handled.

The preferred method of reducing burst cycling is to utilize low frequency gain stage 80. Adjustment of gain stage 80 can vary the low-frequency gain from unity, i.e., equal to the high frequency gain, to zero. Reducing the low-frequency gain of the discriminator decreases the rate at which the adaptive loop narrows the deadband relative to the rate at which the deadband is widened. Drift within the deadband may then be reduced by the non-linear controller before the deadband becomes over-narrowed.

Figure 5A:
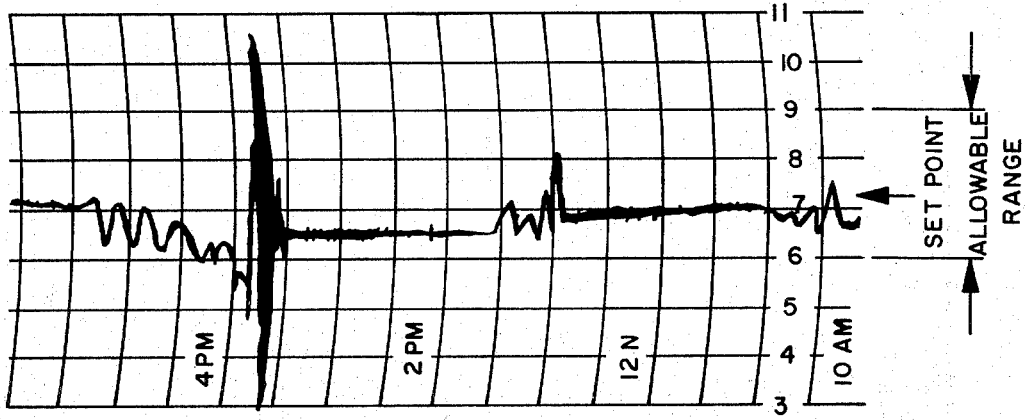
FIGS. 5a and 5b are charts of process measurement signals related to the description of burst cycling.
Figure 5B:
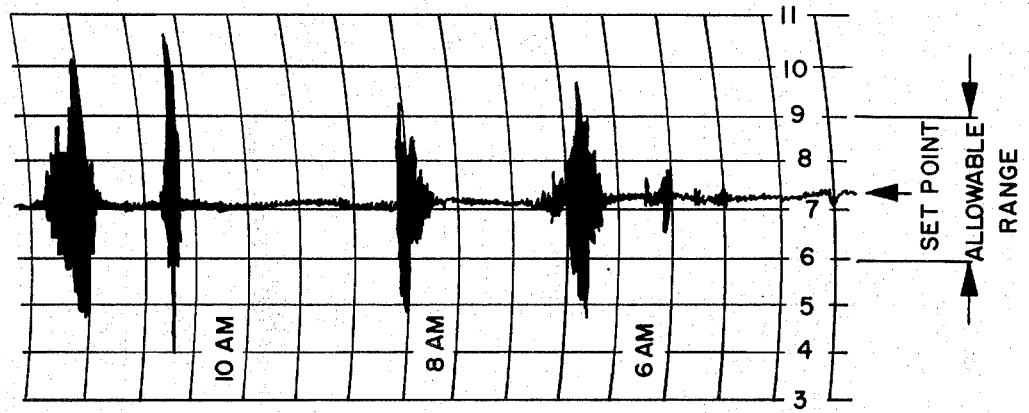

FIG. 5b is a representation of a chart that was generated by recorder 26 in an installation according to the embodiment of the invention shown in FIG. 1 without low-frequency gain stage 80. In FIG. 5b the set point equals 7.2 pH units and the allowable range is from 6 to 9 pH units. During each of the four major bursts the measurement signal went beyond the allowable range. These periodic bursts would continue until the situation was corrected. To prevent the effluent from being discharged in violation of the laws, a backup system is used to immediately block outlet 14 until the measurement returns to the allowable range.

FIG. 5a is a representation of another chart generated in the same manner with a system that includes low-frequency gain unit 80 adjusted to a gain 0.5 times the gain of the high pass side of the discriminator. This chart shows greater drift within the allowable range and less high-frequency oscillation. High frequency oscillation is to be avoided because it wastes expensive reagent. The high-frequency oscillation that began at approximately 3:30 PM was caused by a change in the composition of the effluent that entered tank 10 and resulted in a change of process gain. The other oscillations shown in FIG. 5a were due to load changes.

In a typical installation of a non-linear adaptive control system as described above, the following approximate parameter settings could be used to advantageously control a Ph process having a natural period of 2 minutes.

Primary Loop:
  Proportional Band—50 percent
  Reset Time—1 minute
  Derivative time—0.2 minutes
  Minimum Deadband Gain—0.02 (of the proportional gain)
  Deadband Width—± 1.5 pH units (adjustable from 0 to ± 3.0 pH units by the adaptive loop)
Adaptive Loop:
  Proportional Band—300 percent
  Reset Time—3 minutes
  Cross-Over Period—12 minutes
  Low-Frequency Gain—0.7

The above-described values are merely illustrative and are not to be interpreted as necessary or limiting to the invention.

While the invention has been described above with reference to a preferred embodiment, it should be understood that it is not intended to limit the invention to that alternative, but to cover all alternatives, modifications and equivalents as may be included within the spirit and scope of the invention as defined by the appended claims.

I claim:

1. An improved process control system, for use with a process having a non-linear process gain function, of the type normally having:
   means for generating a measurement signal related to the value of a process variable,
   means for generating an error signal non-linearly related to the deviation of the measurement signal from a preselected set point value, said error signal means having a low gain deadband region for values of measurement signals within a particular range of the set point value and a substantially linear, higher gain region for values of measurement signals outside of the deadband range, and
   control means responsive to the error signal for manipulating the process to reduce the magnitude of the error signal, wherein the improvement comprises:
   means for detecting changes in the process gain function; and
   means to adapt the non-linearity of the error signal means to vary the width of the deadband region in response to changes in the process gain function.

2. The improved control system of claim 1 wherein the detecting means comprises:
   a discriminator responsive to the deviation of the measurement signal from a pre-selected reference value for generating an adaptive error signal related to changes in the process gain function.

3. The improved control systems of claim 2 wherein the pre-selected reference value is equal to the set point value.

4. The improved control system of claim 2 wherein the discriminator is responsive to the frequency characteristics of the measurement signal.

5. The improved control system of claim 4 wherein the discriminator comprises:
a plurality of filters for detecting the presence of particular ranges of frequencies in the measurement signal.

6. The improved control system of claim 5 wherein the discriminator further comprises:
a plurality of rectifiers responsive to the filters to generate signals representative of the frequency ranges present in the measurement signals; and
means to combine the rectifier signals in a predetermined manner to generate the adaptive error signal.

7. The improved control system of claim 6 wherein the discriminator further comprises:
a low pass filter responsive to the presence of frequencies below a pre-selected cross-over frequency;
a low frequency rectifier for rectifying the output of the low pass filter;
a high pass filter responsive to the presence of frequencies above the cross-over frequency;
a high frequency rectifier for rectifying the output of the high pass filter in an opposite sense to the low frequency rectifier; and
a summer for combining the outputs of the rectifiers to generate the adaptive error signal.

8. The improved control system of claim 7 wherein the discriminator further comprises:
a gain stage for changing the gain of one filter rectifier combination with respect to the other to prevent burst cycling.

9. The improved control system of claim 1 further comprising:
means to provide a minimum deadband width to prevent burst cycling.

10. The improved control system of claim 1 wherein the detecting means comprises:
a discriminator responsive to the presence of particular ranges of frequencies in the measurement signal for generating an adaptive error signal related to the dominant frequency range.

11. The improved control system of claim 10 wherein the adaptive means comprises:
means for increasing the deadband width in response to an adaptive error signal characterized by the predominance of a frequency range above a pre-selected cross-over frequency; and
means for decreasing the deadband width in response to an adaptive error signal characterized by the predominance of a frequency range below the cross-over frequency.

12. The improved control system of claim 11 wherein the pre-selected cross-over frequency is below the natural frequency of the process.

13. A control system for use with non-linear process comprising:
a non-linear primary control loop for operating on the process to eliminate any deviation between a measured process variable and a preselected set point;
means responsive to the deviation to narrow the deadband when the process drifts; and
means responsive to the deviation to widen the deadband when the process oscillates.

14. The control system of claim 13 further comprising:
means to provide a minimum deadband to prevent burst cycling.

15. The control system of claim 13 further comprising:
means to decrease the rate at which the deadband is narrowed.

* * * * *